Patented Aug. 25, 1931

1,820,444

UNITED STATES PATENT OFFICE

ARTHUR B. COWDERY, OF NEEDHAM, MASSACHUSETTS, ASSIGNOR TO THE BARRETT COMPANY, A CORPORATION OF NEW JERSEY

PIGMENT AND PROCESS OF PRODUCING THE SAME

No Drawing.  Application filed November 6, 1923.  Serial No. 673,129.

This invention relates to a process of producing a composition of matter containing a high percentage of black pigment composed of carbon in a state of highly dispersed subdivision and it also relates to the product that is produced by the process.

Carbon in a very finely divided state, such as lamp black for example, is used for a variety of purposes, but difficulties often arise in handling it because of its tendency to float in the air and settle upon surrounding objects thus contaminating or blackening them. Attempts have been made by users to overcome this objection by providing a liquid or plastic vehicle or carrier for the carbon which is introduced together with the carbon into the place where the same is to be utilized. Others have tried using agglutinants of different sorts, or binders for the carbon particles, so as to facilitate the introduction of the carbon particles into the places where they are to be used.

By the present invention carbon is obtained in an exceedingly fine state of subdivision as so-called "free carbon" which is not chemically combined to any great extent with other elements, without any danger whatever of its flying around at any time in the atmosphere and ruining adjacent objects by settling thereon. This invention does not require the provision of an expensive carrying medium for the carbon but utilizes cheap materials that may be readily obtained in large quantities. At the same time the carrying medium that is used can with safety be introduced together with the carbon particles without injurious or deleterious results where the carbon particles are needed or perform their desired function.

It is well known that tars contain so-called "free carbon" in amounts that vary with the source of the tars and the manner of producing the same. Coal tars especially contain large amounts of "free carbon" varying considerably in tars from different sources depending, among other things, upon the coal from which the tar is obtained and the temperature of carbonization. The present invention utilizes coal tar as the source from which to obtain the product. In practicing this invention coal tar containing a high percentage of "free carbon" will be selected, or several different coal tars differing in composition and percentages of "free carbon" will be blended so as to obtain a mixture containing a high percentage of "free carbon", and this tar will be distilled to remove volatile constituents until a residue remains which contains 40% or more by weight of black pigment composed of carbon in a state of highly dispersed subdivision that is insoluble in benzol and toluol, whether elemental carbon or a mixture of carbon with insoluble hydrocarbons or other insoluble carbon compounds. It has been found that this material is in an exceedingly fine state of subdivision and is very suitable for use directly for rubber compounding.

The distillation for the removal of the volatile constituents should be carried on at such a temperature and for such a length of time that the residue will contain no constituents that are volatile at the highest temperatures ordinarily used in rubber vulcanization. When the proper tars are used or when tars are so blended together as to make them adaptable for producing the desired product, the highest temperature required for the distillation step will be found to be in the neighborhood of 400° F., and the time required for the distillation will be found to be about ten to fifteen hours. While the distillation is being carried on, great care must be exercised to keep the material in motion as by stirring or agitating the same mechanically or in any other suitable manner so as to prevent the same from being burned or coked in spots and so as to maintain the same substantially homogeneous throughout. Such agitation while distilling seems to increase the amount of pigment in the final product as well as to render it more suitable for rubber compounding.

It has been found in actual practice that the pigment produced as described above can be introduced into a rubber matrix or mix more evenly than is possible with other carbons and with less expenditure of time and power than are required with dry carbons such as carbon blacks or lamp black. This ease of introduction is probably due to the fact that the pigment is highly dispersed in the residue after distillation in an extremely fine state of subdivision, which may be described as a colloidal state. It has been found that with carbons heretofore known it was impossible to disperse them completely in liquid or plastic substances on account of their tendency to flocculate. In the pigment produced as described in this application the free carbon is formed in situ in the hydrocarbon medium and does not have a tendency to flocculate but is susceptible of perfect dispersion in liquid or plastic substances. The explanation for this is believed to reside in the fact that during the distillation each individual particle of carbon appears to become coated with a mineral wax which leaves the particles free to disperse and overcomes the tendency to flocculate.

As a particular example illustrating the invention I may start with a coal tar containing at least 20% of "free carbon" or matter insoluble in hot benzol and toluol and I may distill the same for about twelve hours or until about 25% or 30% by weight of volatile matter has been removed whereupon a residue or pitch will be obtained which will contain at least 40% of pigment as described above and have a melting point of about 220° F. and specific gravity of about 1.3 and will be free from air and moisture and contains no appreciable amount of ash-forming constituents. It is to be understood that tar having a higher percentage of "free carbon" may be used to begin with or the distillation may be continued longer than indicated above thus obtaining a finished product having a higher percentage of pigment, but the example given has been found to produce a very satisfactory product to be used in rubber compounding. A proportion of 50 parts by weight of the pigment to 50 parts by weight of the mineral wax has been found in actual practice to give the desired result, when, for example, automobile tires are to be produced, although other proportions are also satisfactory, whereas if, rubber shoes, for example, are to be produced, a mixture with a smaller amount of the pigment can be used, and there are other products such as rubber soles, for example, in which a mixture with a larger amount of the pigment may be used with advantage.

If several tars are blended to obtain a tar that is to be distilled to produce the final product it is very desirable to mix the tars very thoroughly so as to obtain a uniform product to be distilled otherwise the final product will not be as satisfactory. The blending of different tars to produce a suitable product to be distilled has been found to be desirable because of the difficulty of obtaining any one tar of suitable characteristics in sufficient quantities. A large supply of the raw material can, however, be obtained by blending or mixing several tars from different sources.

The term "free carbon" as used in the specification and claims refers particularly, as hereinbefore indicated, to material insoluble in benzol, the amount of which present in the coal tar residue may be determined, for example, by the method set forth on pages 736 and 820 (Test D5) Vol. 10 (1918) of the Journal of Industrial & Engineering Chemistry.

In the appended claims where reference is made to benzol insoluble constitutents of the coal tar distillation residue which have been produced in situ, I mean those constituents commonly known as "free carbon" which have been formed in the material during the reactions by which the material is produced as distinguished from free carbon extraneously formed and added to the material.

I claim:

1. A material especially adapted for rubber compounding comprising a coal tar distillation residue having not less than about 40% by weight of constituents which have been produced in situ and which are insoluble in benzol, said residue having a melting point of substantially 220° F.

2. A material especially adapted for rubber compounding comprising a coal tar distillation residue having not less than about 40% by weight of constituents which have been produced in situ and which are insoluble in benzol, said residue having a melting point not substantially over 220° F.

3. The process of producing a material especially adapted for rubber compounding which comprises distilling a tar containing not less than about 20% by weight of constituents insoluble in benzol until a residue containing not less than about 40% of material insoluble in benzol remains.

4. The process of producing a material especially adapted for rubber compounding which comprises distilling tar containing not less than about 20% by weight of constituents insoluble in benzol until a residue containing not less than about 40% of material insoluble in benzol and having a melting point not substantially over 220° F. remains.

5. The process of producing a material especially adapted for rubber compounding which comprises heating coal tar containing not less than about 20% by weight of material insoluble in benzol and removing volatile constituents by distillation until a residue containing not less than about 40% of material insoluble in benzol and having a melting point not substantially over 220° F. remains.

In testimony whereof I affix my signature.

ARTHUR B. COWDERY.